United States Patent Office 3,044,357
Patented July 17, 1962

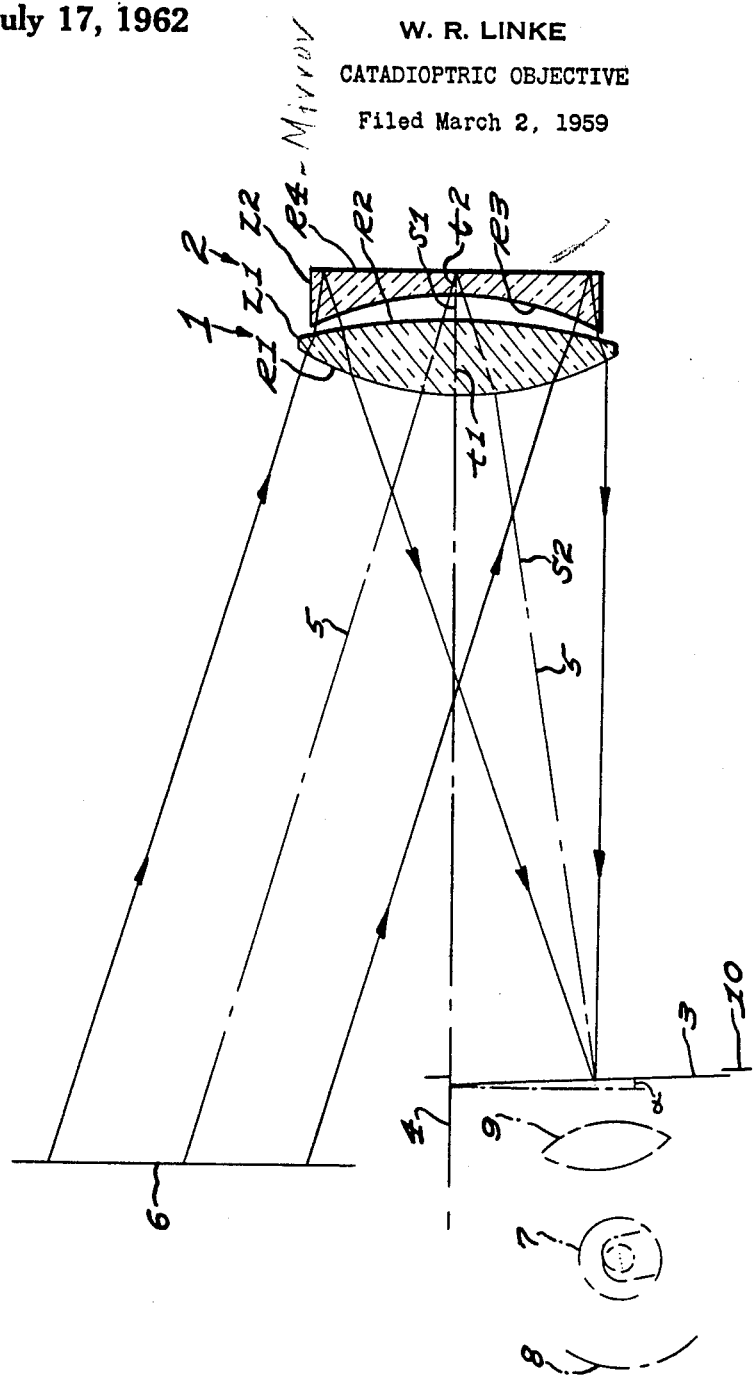

1

3,044,357
CATADIOPTRIC OBJECTIVE
Walter R. Linke, Chicago, Ill., assignor to Bell & Howell Company, Chicago, Ill., a corporation of Illinois
Filed Mar. 2, 1959, Ser. No. 796,494
2 Claims. (Cl. 88—57)

This invention relates to a catadioptric objective, and more particularly to an off-center or oblique objective in which light is collected from only one side of the longitudinal axis and forms an image on the other side of the axis.

An object of the invention is to provide a symmetrical off-axis or oblique catadioptric objective which may include a front lens and a rear lens having a mirror rear surface with a film plane positioned in front of the front lens and at one side of the longitudinal axis of the objective.

Another object of the invention is to provide an off-axis or oblique objective having a positive front lens and a rear mirror-lens having a negative front surface and a plano rear reflective surface together with a film plane positioned on one side only of the longitudinal axis of the objective and gathering light from the other side of that axis.

A further object of the invention is to provide a catadioptric objective in which a series of lenses are provided along with a mirror positioned so as to reflect light from the lenses back through the lenses to a film plane in front of the lenses.

It is to be understood that the terms "front" and "rear" as herein used refer to the ends of the objective respectively nearer the longer and shorter conjugates thereof.

In the accompanying drawing, the single FIGURE illustrates an objective forming one embodiment of the invention, and referring to the drawing, the objective comprises a front component 1 and a rear component 2 and has a tilted focal plane or film plane 3 positioned in front of and wholly to one side of the physical or longitudinal axis 4 of the objective. The top of the film is preferably at the axis 4, and the film is completely below the axis 4. The front component as shown is composed of a biconvex lens $L_1$ having radii of curvature of surfaces $R_1$ and $R_2$ and a thickness $t_1$, and the rear component 2 is composed of a combined mirror and lens $L_2$ having radii of curvature of its front and rear surfaces $R_3$ and $R_4$, the rear surface $R_4$ of the lens $R_2$ being silvered and in the embodiment shown is plano. The reflective surface $R_4$ also may be either convex or concave where desired to correct field curvature. The refracting surfaces $R_1$, $R_2$ and $R_3$ are spherical in the embodiment of the invention shown but, of course, may be cylindrical with parallel axes of generation perpendicular to the plane of the drawing and intersecting the axis 4 of the objective. The film plane 3 is tilted at an angle $\alpha$ away from the normal to the axis 4. The angle $\alpha$ may be such that a ray traveling along the optical axis 5 of the objective is normal to the film plane 3.

When used as a camera, light from an object represented by an element 6 enters the objective wholly above the longitudinal axis 4, travels through the positive front lens $L_1$ which converges the rays to the smaller lens $L_2$, and the negative refracting surface $R_3$ to the reflecting plano surface $R_4$. The surface $R_4$ reflects the light rays back through the negative surface $R_3$ and the lens $L_1$ toward the film plane 3 and the rays are focused into an image on the film plane.

In effect, the stop of the objective is the mirror $R_4$ so that the objective is completely symmetrical which fully corrects distortion and lateral color aberrations.

2

The tilting of the focal plane provides excellent correction of astigmatism.

The objective is ideally suited for use as a projector, particularly a portable projector designed to be placed on a table. When so used, a lamp 7, reflector 8 and condenser lens system 9 are placed behind the film and the element 6 is a screen. The screen may be vertical, and the film plane being tilted to the angle $\alpha$ eliminates keystoning. The film plane is tilted to approximate the curvature of field so that the image at the screen is flat, the angle $\alpha$ being preferably about two degrees from the normal to the physical axis 4 in a preferred embodiment and the optical axis 5 forming an angle of about 10.6 degrees in the preferred embodiment. When used either in a projector or a camera an aperture plate 10 is provided, being in front of the film 3 as shown in the drawing when the objective is used in a camera and preferably being on the other side of the film when the objective is used in a projector.

A preferred example of the invention has an equivalent focal length of 1.0437 inches, an effective aperture of $f/4$, a field angle of fifty degrees and a back focal length $s_2$ of .888 inch, and conforms with the following table in which dimensions are in terms of inches and in which the indices of refraction for the sodium D line and the Abbe dispersion numbers are respectively designated at $n_d$ and V:

| | | | | |
|---|---|---|---|---|
| $L_1$ | $R_1 = +2.187$ | $t_1 = .550$ | $n_d = 1.523$ | $V = 58.6$ |
| | $R_2 = -4.760$ | | | |
| | | $s_1 = .170$ | | |
| | $R_3 = -2.362$ | | | |
| $L_2$ | | $t_2 = .188$ | $n_d = 1.623$ | $V = 38.2$ |
| | $R_4 =$ Plano (Reflective) | | | |
| | | $s_2 = .888$ | | |

The above described objective has a large field angle, and since the film masks only a small part of the bundle of light entering the objective, the objective may be small in diameter. Also, since the surfaces $R_1$, $R_2$ and $R_3$ are used twice and the periphery of the reflecting surface $R_4$ is the top, the objective is symmetrical and there is no distortion.

While the invention is thus described, it is not wished to be limited to the precise details described, as changes may be readily made without departing from the spirit of the invention.

What is claimed is:
1. In a catadioptric objective, a biconvex front lens component, and a rear combined lens and mirror rear component having a front negative refractive surface and a plano rear mirror surface, said components being aligned with one another along a longitudinal axis, said objective having a film plane located in front of the front component and completely on one side of said longitudinal axis and being tilted relative to the normal of an optical axis extending from the film plane angularly relative to the longitudinal axis toward the juncture of the longitudinal axis and the mirror surface to correct curvature of field and keystoning.

2. In a catadioptric objective, a front biconvex singlet lens, a rear lens having a concave front surface and a mirror rear surface axially aligned with the front surface, and a film plane positioned wholly on one side of the longitudinal axis of the lenses and in front of the front lens, the film plane being substantially normal to the optical axis from the front and rear lenses, and further characterized in that said objective complies substantially with the following table in which the dimensions are in terms of inches and beginning with the front end of the objective $L_1$ and $L_2$ designate the lenses, $R_1$ to $R_4$ the radii of curvature of the optical surfaces, $t_1$ and $t_2$ the axial thicknesses, $s_1$ the separation between the lenses along the longitudinal axis of the objecitve, $s_2$ the separation along the optical axis between the front lens and the film plane, $n_d$ the refractive indices for the sodium D line, and V the Abbe dispersion numbers:

| | | | | |
|---|---|---|---|---|
| $L_1$ | $R_1=+2.187$ | $t_1=.550$ | $n_d=1.523$ | $V=58.6$ |
| | $R_2=-4.760$ | $s_1=.170$ | | |
| $L_2$ | $R_3=-2.362$ | $t_2=.188$ | $n_d=1.623$ | $V=38.2$ |
| | $R_4$=Plano (Reflective) | $s_2=.888$ | | |

References Cited in the file of this patent

UNITED STATES PATENTS

| | | |
|---|---|---|
| 620,978 | Schupmann | Mar. 14, 1899 |
| 1,053,650 | Saalburg | Feb. 18, 1913 |
| 1,065,845 | Sauvage | June 24, 1913 |
| 1,355,397 | Heylmun | Oct. 12, 1920 |
| 1,699,689 | Curry | Jan. 22, 1929 |
| 1,783,998 | Chretien | Dec. 9, 1930 |
| 1,967,214 | Acht | July 24, 1934 |
| 1,972,019 | Kanolt | Aug. 28, 1934 |
| 1,977,027 | Vaughn | Oct. 16, 1934 |
| 2,113,397 | Croft | Apr. 5, 1938 |
| 2,141,884 | Sonnefeld | Dec. 27, 1938 |
| 2,174,778 | Croft | Oct. 3, 1939 |
| 2,367,567 | Darby | Jan. 16, 1945 |
| 2,786,387 | Belok | Mar. 26, 1957 |
| 2,968,220 | Steglich | Jan. 17, 1961 |

FOREIGN PATENTS

| | | |
|---|---|---|
| 719,035 | Germany | Mar. 27, 1942 |